(12) United States Patent
Hatamiya et al.

(10) Patent No.: US 6,973,772 B2
(45) Date of Patent: Dec. 13, 2005

(54) GAS TURBINE INSTALLATION

(75) Inventors: Shigeo Hatamiya, Hitachi (JP);
Masahiko Yamagishi, Hitachi (JP);
Osamu Yokomizo, Tokai (JP); Yoshiki Noguchi, Hitachi (JP); Moriaki Tsukamoto, Tokai (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/917,286

(22) Filed: Aug. 13, 2004

(65) Prior Publication Data

US 2005/0011180 A1    Jan. 20, 2005

Related U.S. Application Data

(60) Continuation of application No. 10/670,461, filed on Sep. 26, 2003, now Pat. No. 6,854,259, which is a division of application No. 10/384,519, filed on Mar. 11, 2003, now Pat. No. 6,637,185, which is a division of application No. 10/095,583, filed on May 13, 2002, now Pat. No. 6,560,957, which is a division of application No. 09/403,417, filed on Jan. 5, 2000, now Pat. No. 6,389,799.

(30) Foreign Application Priority Data

Apr. 22, 1997   (JP)   ..................... 9-104179

(51) Int. Cl.[7] ............... F02C 3/30; F02C 7/10
(52) U.S. Cl. ................. 60/39.511; 60/39.53
(58) Field of Search .............. 60/39.3, 39.5, 60/39.511, 39.53, 39.59, 728

(56) References Cited

U.S. PATENT DOCUMENTS

| | | |
|---|---|---|
| 2,115,338 A | 4/1938 | Lysholm |
| 3,657,879 A | 4/1972 | Ewbank et al. |
| 4,418,527 A | 12/1983 | Schlom et al. |
| 4,448,018 A | 5/1984 | Sayama et al. |
| 4,509,324 A | 4/1985 | Urbach et al. |
| 4,773,846 A | 9/1988 | Munk |
| 5,056,109 A | 10/1991 | Gilhousen et al. |
| 5,453,910 A | 9/1995 | Itou et al. |
| 5,537,813 A | 7/1996 | Davis et al. |
| 6,260,350 B1 | 7/2001 | Horii et al. |
| 6,378,284 B1 | 4/2002 | Utamura |
| 6,453,659 B1 | 9/2002 | Van Liere et al. |

FOREIGN PATENT DOCUMENTS

| | | |
|---|---|---|
| CH | 457 039 | 5/1968 |
| DE | 717 711 | 2/1942 |

(Continued)

*Primary Examiner*—Louis J. Casaregola
(74) *Attorney, Agent, or Firm*—Mattingly, Stanger, Malur & Brundidge, P.C.

(57) ABSTRACT

Disclosed is a gas turbine power generating system capable of achieving a high output power and a high power generating efficiency under conditions with a small amount of supplied water and less change in design of a gas turbine.

A fine water droplet spraying apparatus (11) is disposed in a suction air chamber (22) on the upstream side of an air compressor (2), and a moisture adding apparatus (7) for adding moisture to high pressure air supplied from the compressor (2) is disposed. A regenerator (5) for heating the air to which moisture has been added by using gas turbine exhaust gas as a heat source is also provided. With this configuration, there can be obtain an effect of reducing a power for the compressor (2) and an effect of increasing the output power due to addition of moisture to air (20) for combustion. Further, since the used amount of fuel is reduced by adopting a regenerating cycle, the power generating efficiency is improved.

6 Claims, 7 Drawing Sheets

FOREIGN PATENT DOCUMENTS

| | | |
|---|---|---|
| FR | 1 467 142 | 4/1967 |
| JP | 57-79225 | 5/1982 |
| JP | 58-101228 | 6/1983 |
| JP | 63-29091 | 2/1988 |
| JP | 63-32970 | 2/1988 |
| JP | 64-31013 | 2/1989 |
| JP | 4-228832 | 8/1992 |
| JP | 5-86898 | 4/1993 |
| JP | 7-166888 | 6/1995 |
| JP | 8-248685 | 10/1996 |

F I G. 1
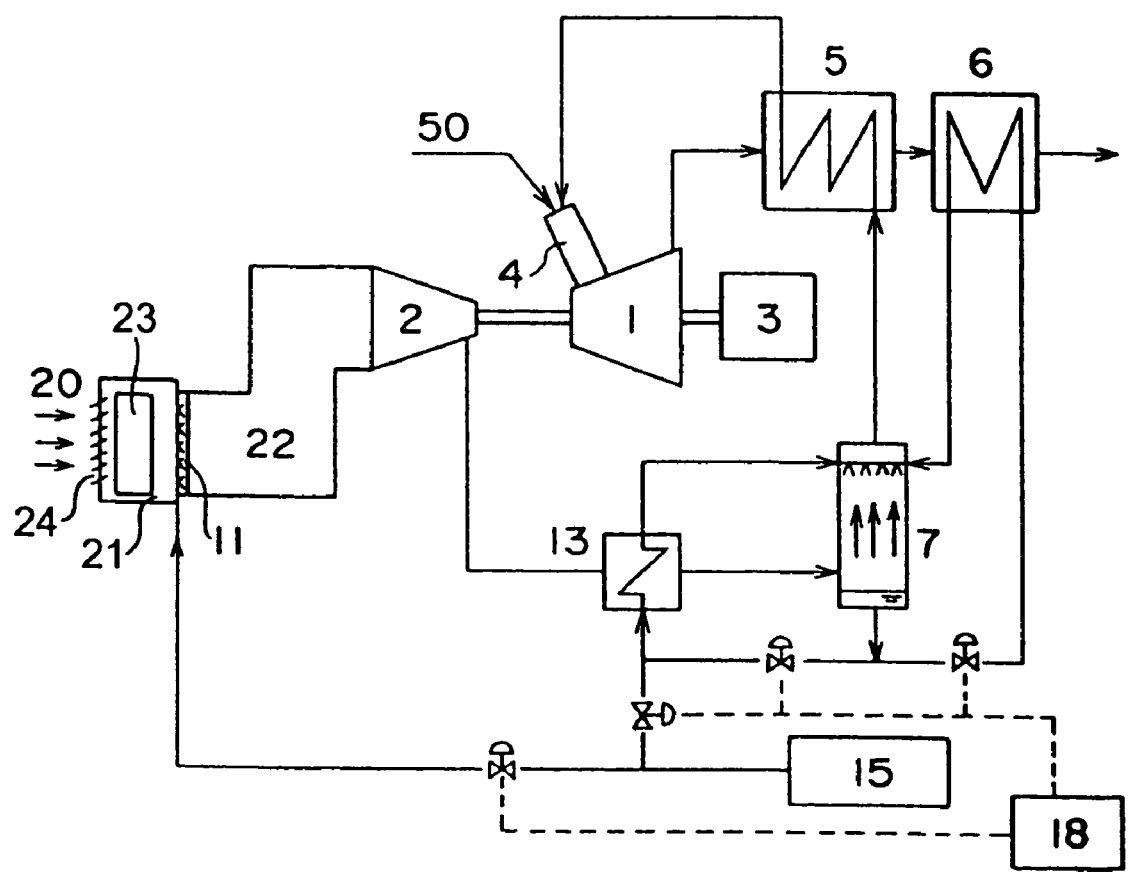

From a water source outside

From a water source outside

GAS TURBINE INSTALLATION

This is a continuation application of U.S. Ser. No. 10/670,461, filed Sep. 26, 2003 now U.S. Pat. No. 6,854,259, which is a divisional application of U.S. Ser. No. 10/384,519, filed Mar. 11, 2003 now U.S. Pat. No. 6,637,185, which is a divisional application of U.S. Pat. No. 6,560,957, issued May 13, 2003, which is a divisional application of U.S. Pat. No. 6,389,799, issued May 21, 2002.

TECHNICAL FIELD

The present invention relates to a gas turbine, and particularly to a high moisture gas turbine cycle using high moisture air for combustion.

BACKGROUND ART

High moisture gas turbine cycles have been disclosed, for example, in Japanese Patent Laid-open Nos. Sho 57-79224, Sho 57-79225, and Sho 58-101228, and U.S. Pat. No. 4,448,018, in which thermal energy of gas turbine combustion exhaust gas or the like is recovered to produce water vapor; the water vapor is mixed in combustion air for the gas turbine; and a turbine is driven by high moisture combustion exhaust gas obtained by a combustor, whereby the output power and the power generating efficiency are enhanced.

A configuration of one of the above high moisture gas turbine cycles has been disclosed, in which a low pressure compressor and a high pressure compressor are arranged in series, and a direct or indirect heat exchanger is interposed between both the compressors, wherein heat recover is performed by injecting water to compressed air emerged from the high pressure compressor.

DISCLOSURE OF INVENTION

In each known example, however, it is required to inject a large amount of water to compressed air to be supplied to a combustor for obtaining a desired output power or a desired power generating efficiency.

When air containing large amount of water is supplied to the combustor, the combustion stability of the combustor becomes low. In particular, for a power generating gas turbine, premixed combustion of air and fuel in a narrow stable combustion range, which is performed for reducing the amount of Nox of exhaust gas, is largely affected by the supply of air including a large amount of water.

Accordingly, the present invention provides a high moisture gas turbine installation capable of enhancing combustion stability while ensuring desired output power and power generating efficiency.

The present invention also provides a high moisture gas turbine installation capable of enhancing combustion stability while ensuring desired output power and power generating efficiency by reducing the amount of water required to obtain the desired output power and power generating efficiency.

The present invention also provides a high moisture gas turbine capable of miniaturizing a humidifier, an apparatus for recovering water from gas turbine exhaust gas, and the like by reducing the amount of supplied water, and further increasing the output power and power generating efficiency by reducing loss in compressed air and exhaust gas.

In a high moisture gas turbine cycle, a large amount of moisture is added to air for combustion. In this case, if moisture is partially added to air supplied from atmospheric air, a humidifier can be miniaturized and a heat exchanger for supplying hot water to the humidifier can be also miniaturized as compared with the method in which moisture is added to compressed air.

As a result, a pressure loss in equipment connected between a gas turbine and air compressors such as the humidifier and heat exchanger is reduced, and thereby the power generating efficiency of the gas turbine can be improved. Also, the power of the air compressor can be reduced even if the air compressor is not divided or a plurality of the air compressors are not arranged in series, and thereby the output power and the power generating efficiency of the gas turbine can be improved.

To be more specific, the present invention provides a gas turbine installation including a compressor for compressing air supplied thereto and discharging the compressed air, a combustor for burning fuel together with the air discharged from the compressor, and a turbine driven by combustion gas generated by the combustor, the gas turbine installation comprising:

a spraying apparatus, which is provided in an air suction chamber disposed on the upstream side of the compressor, and which is used for spraying water droplets to air to be supplied to the compressor thereby making the temperature of the air to be supplied to the compressor lower than the temperature of atmospheric air, the sprayed water droplets being introduced in the compressor together with the air whose temperature has been lowered and being evaporated in a period in which the water droplets flow down in the compressor together with the air;

a water adding apparatus for adding water to the compressed air discharged from the compressor, the compressed air containing moisture added in the form of water droplets by the spraying apparatus;

a regenerator for receiving the compressed air containing moisture added by the water adding apparatus and heating the compressed air by using a gas turbine exhaust gas as a heat source; and a path through which the compressed air heated by the regenerator is supplied to the combustor.

With this configuration, it is possible to operate the gas turbine installation with a high output power and a high power generating efficiency while reducing the amount of water added to compressed air to be supplied to the combustor.

The present invention also provides a gas turbine installation including a compressor for compressing air supplied thereto and discharging the compressed air, a combustor for burning fuel together with the air discharged from the compressor, and a turbine driven by combustion gas generated by the combustor, the gas turbine installation comprising:

a spraying apparatus, which is provided in an air suction chamber disposed on the upstream side of the compressor, and which is used for spraying water droplets to air to be supplied to the compressor, evaporating part of the sprayed water droplets until the water droplets are led in the compressor, and evaporating the non-evaporated water droplets led in the compressor together with the air in a period in which the water droplets flow down in the compressor together with the air;

a water adding apparatus for adding water to the compressed air discharged from the compressor, the compressed air containing moisture added in the form of water droplets by the spraying apparatus;

a regenerator for receiving the compressed air containing moisture added by the water adding apparatus and heating the compressed air by using a gas turbine exhaust gas as a heat source; and a path through which the compressed air heated by the regenerator is supplied to the combustor.

The present invention also provides a gas turbine installation including a compressor for compressing air supplied thereto and discharging the compressed air, a combustor for burning fuel together with the air discharged from the compressor, and a turbine driven by combustion gas generated by the combustor, the gas turbine installation comprising:

a spraying apparatus, which is provided in an air suction chamber disposed on the upstream side of the compressor, and which is used for spraying water droplets to air to be supplied to the compressor, evaporating part of the sprayed water droplets until the water droplets are led in the compressor, and evaporating the non-evaporated water droplets led in the compressor together with the air in a period in which the water droplets flow down in the compressor together with the air;

a water adding apparatus for adding water to the compressed air discharged from the compressor, the compressed air containing moisture added in the form of water droplets by the spraying apparatus;

a regenerator for receiving the compressed air containing moisture added by the water adding apparatus and heating the compressed air by using a gas turbine exhaust gas as a heat source;

a path through which the compressed air heated by the regenerator is supplied to the combustor; and a path used for recovering moisture from combustion exhaust gas having passed through the regenerator and supplying the recovered moisture to at least one of the spraying apparatus and the water adding apparatus.

With these configurations, the amount of supplied water can be reduced. Also since the recovered water containing heat of exhaust gas can be reused and the heat generated by itself can be returned to the upstream side from the combustor, the power generating efficiency of the gas turbine can be further improved. Further, the recovered water is heated by using compressed air or gas turbine exhaust gas as a heat source, a heating apparatus for heating water before addition of the water to the compressed air can be miniaturized. This makes it possible to reduce the pressure loss and hence to further enhance the power generating efficiency.

In the above-described gas turbine installation, preferably, the spraying apparatus comprises sprayers which are arranged in a plurality of steps along the flow of the air in the suction air chamber in such a manner that the temperature of water sprayed from one, positioned on the downstream side, of the sprayers is higher than the temperature of water sprayed from one, positioned on the upstream side, of the sprayers.

With this configuration, since the flow rate in weight at the inlet of the compressor is increased and thereby the water droplets being easy to be evaporated in the compressor can be supplied from the inlet of the compressor, it is possible to stably increase the evaporation amount in the compressor.

To be more specific, suction air is cooled by the water sprayers at the front steps to increase the flow rate in weight of the air, and high temperature water is sprayed to the air from the water sprayers at the rear steps disposed near the inlet of the compressor, whereby water being easy to be evaporated in the compressor can be largely contained in the air to be supplied to the compressor.

In this regard, by making large the ratio of the amount of water supplied to the air by the spraying apparatus to the amount of water added to the compressed air by the water adding apparatus, it is possible to further enhance the output power and the power generating efficiency.

The above-described gas turbine installation preferably further includes:

a control unit for controlling the amount of water added to air in such a manner that the amount of water sprayed to the air by the spraying apparatus is in a range of 1/50 to 1/5 of the amount of water added to the compressed air by the water adding apparatus.

The above amount of water sprayed to the air by the spraying apparatus is preferably in a range of 1/25 to 1/10 of the amount of water added to the compressed air by the water adding apparatus.

The above-described gas turbine installation preferably further includes:

a control unit for controlling the amount of water added to air in such a manner that the amount of water sprayed to the air by the spraying apparatus is in a range of 1/50 to 1/5 of the amount of water added to the compressed air by the water adding apparatus;

wherein the ratio of the amount of circulated water to and from the water adding apparatus to the amount of water added to the compressed air by the water adding apparatus is controlled to be in a range of 70% to 95%.

Further, the above ratio is preferably in a range of 1/25 to 1/10.

In the above-described gas turbine installation, preferably, the ratio of the amount of water sprayed to the air by the spraying apparatus to the flow rate in weight of the air is controlled to be in a range of 0.2% to 5.0%, and the ratio of the amount of water added to the compressed air by the water adding apparatus to the flow rate in weight of the compressed air discharged from the compressor is controlled to be in a range of 30% or less.

The above ratio of the amount of water sprayed to the air by the spraying apparatus to the flow rate in weight of the air is more preferably in a range of 0.4% to 2.5%

The present invention also provides a gas turbine installation including a compressor for compressing air supplied thereto and discharging the compressed air, a combustor for burning fuel together with the air discharged from the compressor, and a turbine driven by combustion gas generated by the combustor, the gas turbine installation comprising:

a spraying apparatus, which is provided in an air suction chamber disposed on the upstream side of the compressor, and which is used for spraying water droplets to air to be supplied to the compressor, evaporating part of the sprayed water droplets until the water droplets are led in the compressor, and evaporating the non-evaporated water droplets led in the compressor together with the air in a period in which the water droplets flow down in the compressor together with the air;

a water adding apparatus for adding water to the compressed air discharged from the compressor, the compressed air containing moisture added in the form of water droplets by the spraying apparatus;

a regenerator for receiving the compressed air containing moisture added by the water adding apparatus and heating the compressed air by using a gas turbine exhaust gas as a heat source;

a path through which the compressed air heated by the regenerator is supplied to the combustor; and a control unit for controlling the temperature of water in such a manner that the temperature of water supplied to the water adding apparatus is higher than the temperature of water supplied to the spraying apparatus.

The control unit can be configured as a water supplying apparatus capable of supplying water at a plurality of temperature levels or an apparatus for recovering water from exhaust gas.

The present invention also provides a gas turbine installation including a compressor for compressing air supplied thereto and discharging the compressed air, a combustor for burning fuel together with the air discharged from the compressor, and a turbine driven by combustion gas generated by the combustor, the gas turbine installation comprising:

a spraying apparatus, which is provided in an air suction chamber disposed on the upstream side of the compressor, and which is used for spraying water droplets to air to be supplied to the compressor, evaporating part of the sprayed water droplets until the water droplets are led in the compressor, and evaporating the non-evaporated water droplets led in the compressor together with the air in a period in which the water droplets flow down in the compressor together with the air;

a water adding apparatus for adding water to the compressed air discharged from the compressor, the compressed air containing moisture added in the form of water droplets by the spraying apparatus;

a regenerator for receiving the compressed air containing moisture added by the water adding apparatus and heating the compressed air by using a gas turbine exhaust gas as a heat source;

a path through which the compressed air heated by the regenerator is supplied to the combustor;

a water supply path used for recovering moisture from combustion exhaust gas having passed through the regenerator and supplying the recovered moisture to the spraying apparatus and the water adding apparatus; and a cooling apparatus for cooling the compressed air flowing on the upstream side of the water adding apparatus by heat exchange with the water supplied to the water adding apparatus.

The above-described gas turbine installation, preferably, further includes, in place of the water supply path, added water supply path used for recovering moisture from combustion exhaust gas having passed through the regenerator and supplying the recovered moisture to the water adding apparatus; and a spray water supply path through which spray water is led from an external source outside the system in the spraying apparatus.

The present invention also provides a gas turbine installation including a compressor for compressing air supplied thereto and discharging the compressed air, a combustor for burning fuel together with the air discharged from the compressor, and a turbine driven by combustion gas generated by the combustor, the gas turbine installation comprising:

a spraying apparatus, which is provided in an air suction chamber disposed on the upstream side of the compressor, and which is used for spraying water droplets to air to be supplied to the compressor, evaporating part of the sprayed water droplets until the water droplets are led in the compressor, and evaporating the non-evaporated water droplets led in the compressor together with the air in a period in which the water droplets flow down in the compressor together with the air;

a water adding apparatus for adding water to the compressed air discharged from the compressor, the compressed air containing moisture added in the form of water droplets by the spraying apparatus;

a regenerator for receiving the compressed air containing moisture added by the water adding apparatus and heating the compressed air by using a gas turbine exhaust gas as a heat source;

the combustor to which the compressed air heated by the regenerator is supplied;

a water supply path used for recovering moisture from combustion exhaust gas having passed through the regenerator and supplying the recovered moisture to the spraying apparatus and the water adding apparatus; and a supplied water heater for heating water to be supplied to the water adding apparatus by using combustion exhaust gas having passed through the regenerator as a heat source.

The above-described gas turbine preferably further includes:

a control unit for reducing, upon decrease in load, the amount of water to be added to the compressed air by the water adding apparatus and then reducing the amount of water to be sprayed to the air by the spraying apparatus; or a control unit for increasing, upon increase in load, the amount of water to be sprayed to the air by the spraying apparatus and then increasing the amount of water to be added to the compressed air by the water adding apparatus.

The present invention also provides an efficiency increasing apparatus, provided in a gas turbine installation, for recovering thermal energy of gas turbine exhaust gas thereby improving power generating efficiency, the gas turbine installation including a compressor for compressing air supplied thereto and discharging the compressed air, a combustor for burning fuel together with the air discharged from the compressor, and a turbine driven by combustion gas generated by the combustor;

the efficiency increasing apparatus comprising:

a spraying apparatus, which is provided in an air suction chamber disposed on the upstream side of the compressor, and which is used for spraying water droplets to air to be supplied to the compressor, evaporating part of the sprayed water droplets until the water droplets are led in the compressor, and evaporating the non-evaporated water droplets led in the compressor together with the air in a period in which the water droplets flow down in the compressor together with the air;

a water adding apparatus for adding water to the compressed air discharged from the compressor, the compressed air containing moisture added in the form of water droplets by the spraying apparatus; and a regenerator for receiving the compressed air containing moisture added by the water adding apparatus and heating the compressed air by using a gas turbine exhaust gas as a heat source.

The present invention also provides an efficiency increasing apparatus, provided in a gas turbine installation, for recovering thermal energy of gas turbine exhaust gas thereby improving power generating efficiency, the gas turbine installation including a compressor for compressing air supplied thereto and discharging the compressed air, a combustor for burning fuel together with the air discharged from the compressor, and a turbine driven by combustion gas generated by the combustor;

the efficiency increasing apparatus comprising:

a spraying apparatus, which is provided in an air suction chamber disposed on the upstream side of the compressor, and which is used for spraying water droplets to air to be supplied to the compressor, evaporating part of the sprayed water droplets until the water droplets are led in the compressor, and evaporating the non-evaporated water droplets led in the compressor together with the air in a period in which the water droplets flow down in the compressor together with the air;

a water adding apparatus for adding water to the compressed air discharged from the compressor, the compressed air containing moisture added in the form of water droplets by the spraying apparatus;

a regenerator for receiving the compressed air containing moisture added by the water adding apparatus and heating the compressed air by using a gas turbine exhaust gas as a heat source; and a path used for recovering moisture from combustion exhaust gas having passed through the regenerator and supplying the recovered moisture to at least the water adding apparatus of a group of the spraying apparatus and the water adding apparatus.

The above-described efficiency increasing apparatus preferably further includes:

a control unit for controlling the amount of water added to air in such a manner that the amount of water sprayed to the air by the spraying apparatus is in a range of 1/50 to 1/5 of the amount of water sprayed to the compressed air by the water adding apparatus. The amount of water sprayed to the air by the spraying apparatus is more preferably in a range of 1/25 to 1/10 of the amount of water sprayed to the compressed air by the water adding apparatus.

BRIEF DESCRIPTION OF DRAWINGS

FIG. 1 is a schematic diagram showing one embodiment of the present invention;

BEST MODE FOR CARRYING OUT THE INVENTION

Figure 2:
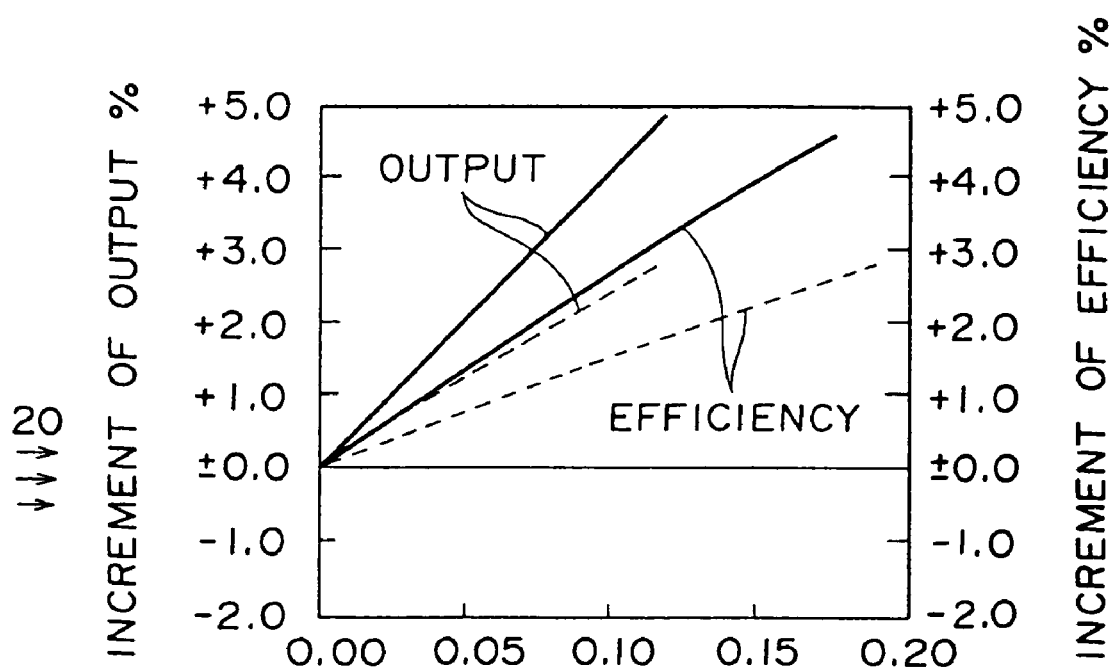
FIG. 2 is a schematic diagram showing effects of a spraying apparatus 11 for spraying water to suction air and a humidifier 7.

Hereinafter, embodiments of the present invention will be described with reference to the drawings. FIG. 1 is a schematic flow diagram of a gas turbine cycle showing a first embodiment. A gas turbine power generating installation includes, as shown in FIG. 1, a compressor 2 for compressing air and discharging the compressed air; a combustor 4 to which air compressed by the compressor is supplied; a gas turbine 1 driven by a combustion exhaust gas discharged from the combustor; and a power generator 3 connected to the gas turbine 1 via a shaft. The power generator 3 is connected to a power transmission line not shown in FIG. 1. It should be noted that in this figure, a pump and the like are not shown.

An air suction chamber 22 for sucking air and supplying the air to the compressor 2 is connected to the compressor 2. At the leading end of the air suction chamber, typically, a suction air filtering chamber 21 containing a filter 23 is disposed. A louver 24 is disposed on an upstream side portion of the suction air filtering chamber 21.

A spray apparatus 11 for spraying water to suction air, which is disposed in the suction air chamber, includes a spray typically configured as a spray nozzle described in Japanese Patent Laid-open No. Hei 9-236024. The Zautor's mean particle diameter (S.M.D) of water droplets sprayed by the spray nozzle is about 10 $\mu$m. In this embodiment, the spraying apparatus 11 is disposed at the inlet of the compressor, for example, in the suction air chamber 22 separated apart from a first stage stationary blade. To be more specific, in the example shown in FIG. 1, the spraying apparatus 1 is disposed on the downstream side of the suction air filter 23 in the filtering chamber 21.

A path for supplying a water to be sprayed is communicated to the spraying apparatus 11. Water to be sprayed is supplied from a water supplying apparatus 15 to the path.

A water adding apparatus for adding moisture to compressed air by spraying water droplets to the compressed air is disposed in a path through which the compressed air discharged from the compressor 2 is supplied to the combustor 4. The water adding apparatus is typically configured as a humidifier 7. A regenerator 5 is provided for receiving the compressed air from the humidifier 7 and heating the compressed air by using gas turbine exhaust gas as a heat source. The compressed air heated by the regenerator 5 is supplied to the combustor 4.

The humidifier 7 has a path through which water is supplied to the compressed air having been fed to the humidifier 7. Water poured from the water supplying apparatus 15 is supplied to the path. It may be desirable that a path be provided for circulating recovered part of the above poured water in order to supply the recovered water to the humidifier 7 again. The water supplying apparatus 15 may be configured to receive water from a water source outside the system composed of the gas turbine installation and its associated equipment, or it may be configured to receive water from a water source inside the system composed of the gas turbine installation and its associated equipment. Alternatively, one of the water spraying apparatus 11 and the humidifier 7 may be configured to receive water from a water source outside the system and the other be configured to mainly receive recovered water as show in FIG. 3A.

The humidifier 7 may be of a type in which water droplets are sprayed to flow of compressed air or a type in which water is supplied to a structure facing to a flow path through which air flows thereby bringing water into thermal contact with the flow of compressed air. In the former case, if the humidifier 7 is of the same spraying type as that of the spraying apparatus 11, most of water having been supplied to compression air can be recovered and added to the compression air again. In the latter case, or in the former case using a general spraying nozzle, the amount of water having been supplied to compressed air is much recovered, and part of the recovered water can be added to compressed air again.

In each type, to promote evaporation of water to be supplied to compressed air, it may be preferable to set the temperature of the water at a high value.

The gas turbine installation in this embodiment is preferably provided with a supplied water heater 6. The supplied water heater 6 is used for receiving water supplied from the water supplying apparatus 15 or water poured to compressed air and recovered therefrom, and heating the water by heat exchange using exhaust gas discharged from the gas turbine 1 as a heat source. Water supplied into the supplied water heater 6 is heated once thereat, and is supplied to the humidifier 7.

As a result, water supplied to the humidifier is easy to be evaporated. Water supplied to the supplied water heater 6 is heated once thereat, and is then supplied to the humidifier 7 as incoming water.

The provision of the supplied water heater 6 is advantageous in recovering thermal energy, which has been conventionally discharged as exhaust gas into atmospheric air, by the supplied water heater 6, thereby improving the output power and power generating efficiency of the gas turbine power generating system.

The gas turbine installation in this embodiment is also preferably provided with an after-cooler 13. The after-cooler 13 is used for receiving water supplied from the water supplying apparatus 15 or water poured in compressed air at the humidifier 7 and recovered therefrom, and heating the water by heat exchange using compressed air fed to the humidifier 7 as a heat source. Water supplied to the after-cooler 13 is heated once, and is supplied to the humidifier 7.

The provision of the after-cooler 13 is advantageous in that since the temperature of water supplied to the humidifier is increased and thereby the water is easy to be evaporated, the humidifier can be miniaturized as compared with that in combination with no after-cooler on the basis of the same added amount of water. Another advantage of provision of the after-cooler 13 is that since the temperature of air led to the humidifier becomes lower and thereby the temperature of the humidified air at the outlet of the humidifier can be made lower, the temperature range of thermal recovery from gas turbine exhaust gas performed at the regenerator 5 becomes wider, with a result that it is possible to recover thermal energy which has been discharged as exhaust gas in atmospheric air and hence to improve the output power and power generating efficiency of the gas turbine power generating system.

More preferably, as shown in FIG. 1, the supplied water heater 6 and the after-cooler 13 are both provided in the gas turbine installation.

The gas turbine installation is also provided with a control unit 18. The control unit 18 is used for controlling the amounts of water supplied to the spraying apparatus 11, the humidifier 7, and the after-cooler 13, and the amount of water having been supplied to compressed air at the humidifier, being recovered, and circulated in the after-cooler 13 or the supplied water heater 6.

The operation of the above-described system will be described below.

Air 20 entered from atmospheric air into the suction air filtering chamber 21 is sprayed with water droplets by the spraying apparatus 11, and is led to the inlet of the compressor 2 through the suction air chamber 22. The air 20 is compressed to typically about 15 atm by the compressor 2 and is discharged (for example, at about 360° C.). The discharge pressure may be set at 20 atm or more depending on the kind of the gas turbine. The compressed air discharged from the compressor 2 is fed to the after-cooler 13. The temperature of the compressed air is reduced by the after-cooler 13. The compressed air is then led to the humidifier 7. At the humidifier 7, water having been heated to a high temperature by heat recovery at the after-cooler 13 and the supplied water heater 6 flows from top to bottom, and air having been cooled at about 100° C. by the after-cooler 13 flows from bottom to top, so that the flow of air is brought into direct-contact with the counter flow of hot water, whereby the moisture content in air is increased. The air flows out of the humidifier 7 in the form of saturated air (high moisture air) with its temperature increased to about 140° C. and with its relative humidity increased to about 100%, and flows in the regenerator 5. The high moisture air having entered the regenerator receives thermal energy from gas turbine exhaust gas, to be heated to a high temperature, and is fed into the combustor 4. At the combustor 4, fuel 50 is burned together with the high moisture air fed thereto, and high temperature combustion gas is fed from the combustor 4 to the gas turbine 1. The gas turbine 1 drives the power generator 3. The combustion gas having passed through the gas turbine 1 flows out of the gas turbine 1 in the form of high temperature exhaust gas, passing through the regenerator 5 and the supplied water heater 6, and is discharged in atmospheric air.

In addition, water used in the spraying apparatus 11 and the humidifier 7 are supplied from the water supplying apparatus 15.

The function of the above-described system configuration, which is capable of increasing the output power and power generating efficiency of the system, will be described below.

Air having entered the suction air chamber 22 is sprayed with water droplets by the spraying apparatus 11 as described above. At this time, water droplets sprayed to the air is partially evaporated to cool the air. The air flows in the inlet of the compressor 2. When air is cooled, the density of the air becomes large. Accordingly, the flow rate in weight of the air flowing in the compressor is increased. As a result, an effect of increasing the output power of the gas turbine can be obtained.

In the compressor, the air is compressed and thereby the temperature of the air is increased, with a result that the water droplets remaining non-evaporated in the air having been led to the compressor 2 absorb evaporation latent heat from the surrounding air, to be thereby evaporated. Accordingly, in the case where water droplets are added, the air temperature at the outlet of the compressor is made lower than that in the case where water droplets are not added. The compression work of the air compressor is dependent on the temperatures at the inlet and outlet of the compressor, and if the temperature rise of air at the outlet of the compressor is suppressed, the compression work of the compressor is reduced. For the gas turbine, 50% or more of the output power generated by the gas turbine is consumed as a power required for the compressor, and for the gas turbine having a higher compression ratio, the percentage of the output power consumed as the power required for the compressor becomes further larger. Accordingly, the reduction in compression work of the compressor leads to the increase in net output power of the gas turbine.

The water droplets sprayed to the air by the spraying apparatus 11 are evaporated during a period in which they flow down in the suction air chamber extending to the inlet of the compressor and in the compressor, to produce moisture containing compressed air at a high temperature (for example, about 360° C.). The compressed air is cooled once by the after-cooler 13, to become moisture containing compressed air at about 100° C., and is led to the humidifier 7. The humidifier is provided for increasing the moisture content in the compressed air. Heat recovered from gas turbine exhaust gas via the supplied water heater 6 or heat possessed in the compressed air is used as thermal energy necessary for evaporation of water in the humidifier. To improve the power generating efficiency of the power generating system, it may be desirable to effectively recover heat in a temperature range being as low as possible and hence to make heat to be discharged to the outside as small as possible. The combination of the after-cooler and the humidifier can obtain water at a low temperature on the basis of the same principle as that for a cooling tower making use of a phenomenon in which upon evaporation of water, the water loses the latent heat, to lower the temperature thereof. Accordingly, it is possible to recover heat in a lower temperature range, and hence to improve the power generating efficiency of the power generating system.

The high moisture air flows out of the humidifier 7 as saturated air with its temperature increased to about 140° C. and its relative humidity increased to 100%, and flows in the regenerator 5. The saturated air thus supplied in the regenerator 5 absorbs heat recovered from gas turbine exhaust gas, to become high temperature air kept at, for example, about 550° C. at the outlet of the regenerator 5. The high temperature air flows in the combustor 4. In the combustor 4, fuel is burned together with the high temperature air, to produce combustion gas at a specific temperature. In such a system provided with the regenerator 4, since the air used for combustion is heated at a high temperature by the regenerator, the necessary fuel amount becomes smaller than that in the system provided with no regenerator. In this way, the use of the regenerator gives a large effect to improvement in power generating efficiency of the power generating system.

In the case of operating the system with the combustion temperature controlled to a specific value, if the amount of moisture contained in air supplied to the combustor 4 becomes larger, the oxygen concentration in the air becomes smaller. According to the system in this embodiment, however, since the amount of water required to be supplied for obtaining the same output power and power generating efficiency can be made smaller than that in the related art system in which water is added to air having been already compressed, the oxygen concentration of the air supplied to the combustor 4 can be made higher, to thereby attain more stable combustion. Further, according to the system in this embodiment, the necessary fuel amount for obtaining the same output power and power generating efficiency can be made smaller than that in a system using only the spraying apparatus 11 for adding water to air, so that it is possible to further increase the power generating efficiency of the power generating system.

In the turbine 1, since a large amount of moisture is contained in combustion gas, the flow rate of the combustion gas is increased in proportion to the added amount of moisture, thereby increasing the output power of the turbine; and since water vapor having a specific heat larger than that of air is mixed in the air, the specific heat of the mixed gas becomes large, with a result that the work obtained when the compressed mixed gas is expanded in the turbine is increased. As a result, the output power of the turbine 1 is increased by the above two effects.

In this way, according to this embodiment, it is possible to attain stable combustion while improving the output power and power generating efficiency of the power generating system, and hence to attain highly efficient, stable combustion even upon partial loading.

Further, according to this embodiment, the system includes the spraying apparatus 11 and the water adding apparatus 7. The spraying apparatus 11 is disposed in the suction air chamber 22 on the upstream side of the compressor 2 and is used for spraying water to air to be supplied to the compressor 2 so as to lower the temperature of the air to be supplied to the compressor 2 than that of atmospheric air, wherein water droplets sprayed on the air are evaporated in a period in which the water droplets led in the compressor 2 together with the air whose temperature has been lowered flow down in the compressor 2. The water adding apparatus 7 is used for adding water to the compressed air containing moisture added by the spraying apparatus 11 and discharged from the compressor 2. With this configuration, the system can be highly efficiently operated at a high output power in a state in which the amount of water added in compressed air supplied to the combustor is reduced.

The system in this embodiment, therefore, has the feature in which the same output power and power generating efficiency can be attained with a reduced amount of water added in the compressed air supplied to the combustor as compared with the system in which moisture is added to air having been already compressed by the compressor.

Such a function of the system will be described below.

First, the reason why the amount of water added to the compressed air supplied to the combustor in the system of the present invention can be made smaller than that in the related art system will be described.

According to the related art system of adding moisture to compressed air (high moisture gas turbine system, for example, HAT system), moisture is added to air for combustion by a humidifier, and in this case, heat recovered from gas turbine exhaust gas by a supplied water heater, heat recovered by intermediate cooling by a compressor, and heat possessed by the compressed air itself are used for thermal energy required for evaporating water in the humidifier. On the other hand, according to the system of the present invention, as described above, since the intermediate cooler is not used, heat recovered by the intermediate cooler is not present; and fine water droplets are sprayed to air to be supplied to the compressor and are evaporated until they flow into the compressor and in the compressor, whereby moisture is somewhat added to the air for combustion before the air flows in the humidifier.

FIG. 2 shows the increment in output power of the system of the present invention on the basis of the output power of a comparative system under a condition with the same amount of supplied water. The comparative system includes a low pressure compressor and a high pressure compressor arranged in series and an intermediate cooler, wherein water is added to compressed air discharged from the high pressure compressor. According to the system of the present invention, moisture is added in two stages: in the front stage in which moisture is sprayed to air before the air flows in the compressor, and in the rear stage in which moisture is added to the compressed air discharged from the compressor (for example, by the humidifier), and accordingly, the ratio of the amount of water sprayed to the air before the air flows in the compressor to the total amount of supplied water is indicated on the abscissa. In the figure, when the amount of water sprayed to suction air is zero, the total amount of supplied water is equivalent to the amount of water added to the compressed air by the humidifier.

In FIG. 2, a broken line shows data obtained by the related art system in which water is added by the intermediate cooler and also water is added to compressed air discharged from the high pressure compressor. In this case, the ratio of the amount of water added by the intermediate cooler to the total amount of supplied water is indicated on the abscissa.

From the results shown in FIG. 2, it is evaluated that as the ratio of the amount of water supplied by the spraying apparatus 11 to the total amount of supplied water becomes larger, the increment in output power of the system of the present invention on the basis of the output power of the comparative system becomes larger.

Accordingly, when the system of the present invention is compared with the comparative system under a condition with the same output power, as the ratio of the amount of water supplied by the spraying apparatus 11 of the system of the present invention to the total amount of supplied water becomes larger, the used amount of water becomes smaller than that in the comparative system. As a result, the system of the present invention can obtain more stable combustion while ensuring a high output power and a high power generating efficiency, thereby increasing the reliability of the gas turbine installation.

The reason for this will be described on the basis of the mechanism in which the output power is increased by making large the ratio of the amount of water sprayed to suction air.

As described above, the addition of water to suction air to be supplied to the compressor by spraying increases the output power of the gas turbine. This causes the following four effects:

(1) a first effect in which suction air is cooled and is increased in density until it flows in the compressor, so that the flow rate in weight of the air to be supplied to the compressor is increased, to thereby increase the output power of the turbine;

(2) a second effect in which when being evaporated in the compressor, water droplets absorb evaporation latent heat from the surrounding gas, so that the temperature rise of the air compressed and thereby intended to be increased in temperature is suppressed, to thereby reduce the compression work of the compressor;

(3) a third effect in which the flow rate on the turbine side is increased in proportional to the evaporated amount of water droplets, to thereby increase the output power of the turbine; and (4) a fourth effect in which since water vapor having a specific heat larger than that of air is mixed in the air, the specific heat of the mixed gas becomes large, with a result that the work obtained when the compressed mixed gas is expanded in the turbine is increased.

The system of the present invention exhibits the above effects (1) to (4); however, the comparative system does not exhibit the effects (1) and (2) but exhibits the effects (3) and (4) by adding the moisture to the compressed air.

On the other hand, FIG. 2 also shows the increment in power generating efficiency of the system of the present invention on the basis of the power generating efficiency of the comparative system. From the results shown in FIG. 2, it is evaluated that the ratio of the amount of water supplied by the spraying apparatus 11 to the total amount of supplied water becomes larger, the increment in efficiency of the system of the present invention on the basis of the efficiency of the comparative system becomes larger.

Accordingly, when the system of the present invention is compared with the comparative system under a condition with the same efficiency, as the ratio of the amount of water supplied by the spraying apparatus 11 of the system of the present invention to the total amount of supplied water becomes larger, the used amount of water becomes smaller than that in the comparative system.

For a gas turbine system in which the spraying apparatus 11 is simply provided to the compressor, since the compression work is reduced, the effect of increasing the output power becomes large; however, since the temperature of the air at the outlet of the compressor is lowered, that is, the temperature of the air to e supplied to the compressor is lowered, the used amount of fuel at the combustor becomes large, so that it is not expect to increase the power generating efficiency.

In the comparative system in which water is supplied to compressed air, if the used amount of water is set to a value, the output power and the power generating efficiency are correspondingly determined at respective values. As a result, if it is intended to improve the output power and the power generating efficiency by strengthening intermediate cooling, heat recovered by intermediate cooling is consumed to increase the amount of moisture added to the compressed air in the humidifier. That is to say, to improve the output power and the power generating efficiency, the mount of water must be increased.

On the contrary, the system in this embodiment includes the spraying apparatus 11, the humidifier 7, and the regenerator 5. The spraying apparatus 11, provided in the air suction chamber 22 disposed on the upstream side of the compressor 2, is used for spraying water droplets to air to be supplied to the compressor 2 thereby making the temperature of the air to be supplied to the compressor 2 lower than the temperature of atmospheric air. The sprayed water droplets are introduced in the compressor 2 together with the air whose temperature has been lowered and are evaporated in a period in which the water droplets flow down in the compressor 2 together with the air. The humidifier 7 is used for adding water to the compressed air which contains moisture added in the form of water droplets by the spraying apparatus 11 and which is discharged from the compressor 2. The regenerator 5 is used for receiving the compressed air containing moisture added by the humidifier 7 and heating the compressed air by using a gas turbine exhaust gas as a heat source. Accordingly, the system can reduce the compression work while suppressing the reduction in the temperature of the compressed air to be supplied to the combustor. In particular, the system has a significant effect in which since the air for combustion is heated by the regenerator, even when moisture is added to the air, the output power can be increased while the used amount of fuel in the combustor is little increased. In addition, according to this embodiment, under a condition with the same supplied amount of water as that in the comparative system, the output power and the power generating efficiency can be improved by increasing the ratio of the amount of water sprayed to air by the spraying apparatus 11 to the amount of water added to air by the humidifier 7. In other words, according to this embodiment, under a condition with the same output power and the power generating efficiency, the moisture content in the compressed air to be supplied to the combustor 4 can be reduced, with a result that the combustion stability can be improved.

In the related art system including the intermediate cooler for reducing a power for the compressor, there occur a pressure loss and a heat radiation loss accompanied by the heat exchanger; however, in the system of the present invention in which water is sprayed to suction air, there little occur these losses, to thereby effectively improve the output power and the power generating efficiency.

The size of the water droplets sprayed from the spraying apparatus 11 is set to be 30 $\mu$m or less, preferably, 10 $\mu$m or less from the viewpoint of suppressing erosion of blades. The lower limit of the size of the water droplets may be set at about 1 $\mu$m in consideration of the technical viewpoint and energy required for production of fine water droplets.

If a silencer is disposed in the suction air chamber 22, the spraying apparatus 11 is preferably located on the downstream side of the silencer. For example, the spraying apparatus 11 can be located in proximity to the downstream end of the silencer. If a screen or the like is disposed in the suction air chamber 22, the spraying apparatus 11 is preferably located, for example, on the downstream side of the screen from the viewpoint of adhesion of sprayed water droplets on the screen.

The ratio of the amount of water sprayed to air by the spraying apparatus 11 to the amount of water added to compressed air by the humidifier 7 is preferably controlled to be in a range of 1/50 to 1/5, preferably, 1/25 to 1/10.

By controlling the ratio between both the water amounts at a value in the above range, it is possible to obtain a more substantial effect, to attain stable combustion, and to improve the stability of equipment of the system. However, it may be desirable to suitably adjust the upper and lower limits of the above range depending on characteristics of the equipment.

The system in this embodiment includes the spraying apparatus 11 and the humidifier 7, wherein heat of water recovered by the humidifier 7 is recovered by the after-cooler 13 or the supplied water heater 6. The spraying apparatus 11, provided in the air suction chamber 22 disposed on the upstream side of the compressor 2, is used for spraying water droplets to air to be supplied to the compressor 2 thereby making the temperature of the air to be supplied to the compressor 2 lower than the temperature of atmospheric air. The sprayed water droplets are introduced in the compressor 2 together with the air whose temperature has been lowered and are evaporated in a period in which the water droplets flow down in the compressor 2 together with the air. In this case, most of the amount of sprayed water flows together with the suction air, and thereby recovered water is not substantially present or little present. The humidifier 7 is used for adding water to compressed air, which contains moisture added in the form of water droplets by the spraying apparatus 11 and which is discharged from the compressor 2, by bringing the compressed air into contact with water flowing in a structure disposed facing to the flow path of the compressed air. In this case, part of the supplied water is added to the air and the remaining water is recovered. With this configuration, it is possible to ensure a sufficient recovered calorie and to operate the system with a higher output power.

Further, the system of the present invention preferably further includes: a control unit for controlling the amount of water added to air in such a manner that the amount of water sprayed to the air by the spraying apparatus 11 is in a range of 1/50 to 1/5 of the amount of water added to the compressed air by the humidifier 7; wherein the ratio of the amount of circulated water to and from the humidifier 7 to the amount of water added to the compressed air by the humidifier 7 is preferably controlled to be in a range of 70% to 95%.

By setting the ratio between both the water amounts at a value in the above range, it is possible to ensure a sufficient recovered calorie, to attain stable combustion, and to obtain a high output power and a high power generating efficiency.

The ratio of the amount of water sprayed by the spraying apparatus 11 to the flow rate in weight of the air is preferably controlled to be in a range of 0.2% to 5.0%, preferably, 0.4% to 2.5%; while the ratio of the amount of water sprayed by the humidifier 7 to the flow rate of the compressed air discharged from the compressor is preferably controlled to be in a range of 1.0% to 30%.

The supply of water to air upon starting the system may be performed in the following manner:

In a period from a starting point to a time point in which the gas turbine is applied with a loaded, the supply of sprayed water by the spraying apparatus is stopped, and compressed air is allowed to flow in a bypass line (not shown) for leading the compressed air discharged from the compressor 2 to the regenerator 5 while bypassing the humidifier 7 and/or the after-cooler 13.

In the subsequent period until rated operation, the supply of water by the spraying apparatus 11 remains stopped, and the compressed air discharged from the compressor 2 is allowed to flow from the bypass line to the humidifier 7 and/or the after-cooler 13 and water is added to the compressed air at the humidifier 7.

In the period after rated operation, water is sprayed by the spraying apparatus 11, to thereby start the gas turbine in a short time.

In the case of a change in load, the supply of water to air is controlled as follows:

When the load is reduced, the amount of water added to the compressed air by the humidifier 7 is reduced and then the amount of water sprayed by the spraying apparatus is reduced.

When the amount of water added to the compressed air by the humidifier 7 is reduced, the amount of fuel 50 may be reduced together with the amount of water, as needed.

When the load is increased, the amount of water sprayed by the spraying apparatus 11 is increased and then the amount of water added to the compressed air by the humidifier 7 is increased.

With this configuration, in addition to the above-described effects, there can be obtained an effect of capable of operating the system at a high efficiency upon partial loading.

It should be noted that the above description of the control is for illustrative purposes only, and it is to be understood that the present invention is not limited thereto.

A second embodiment will be described with reference to FIG. 3.

Figure 3:
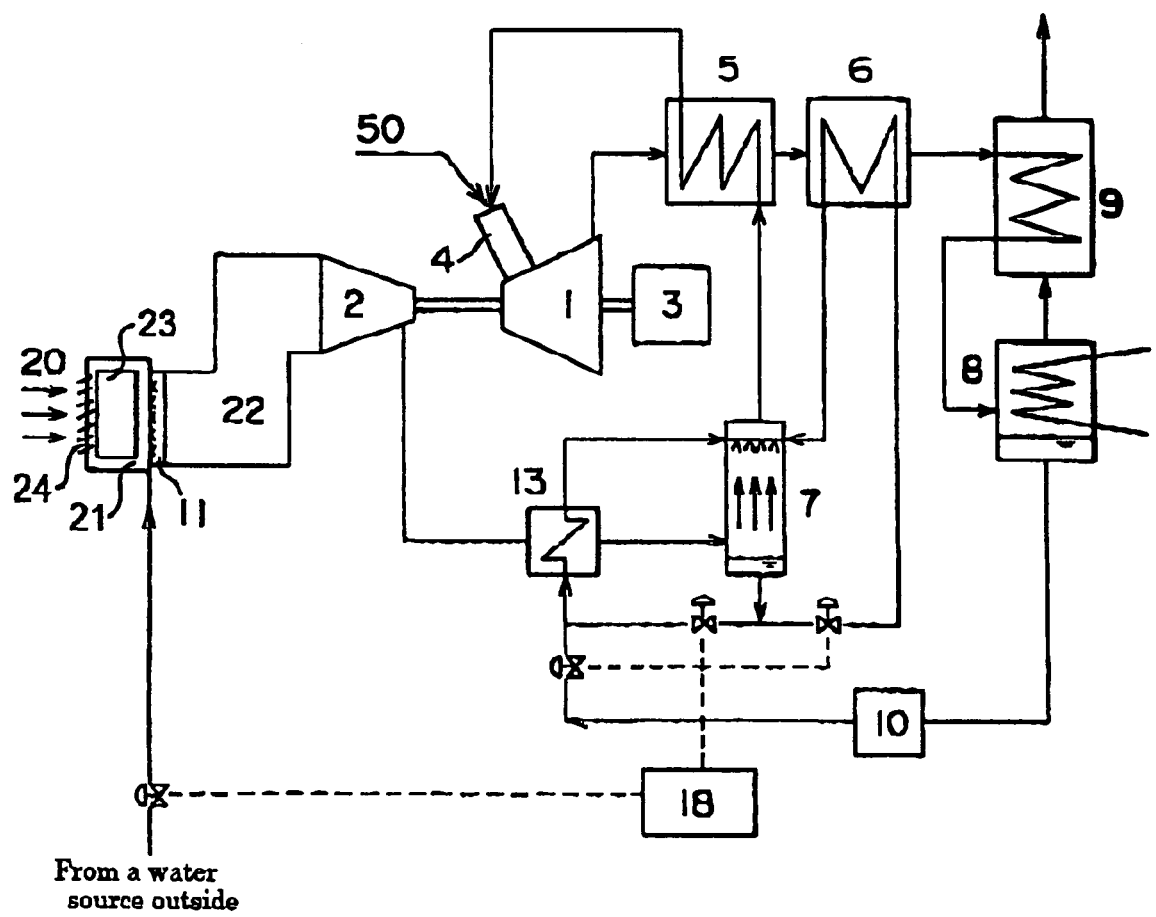
FIG. 3 is a schematic diagram showing one embodiment of the present invention.
Figure 3A:
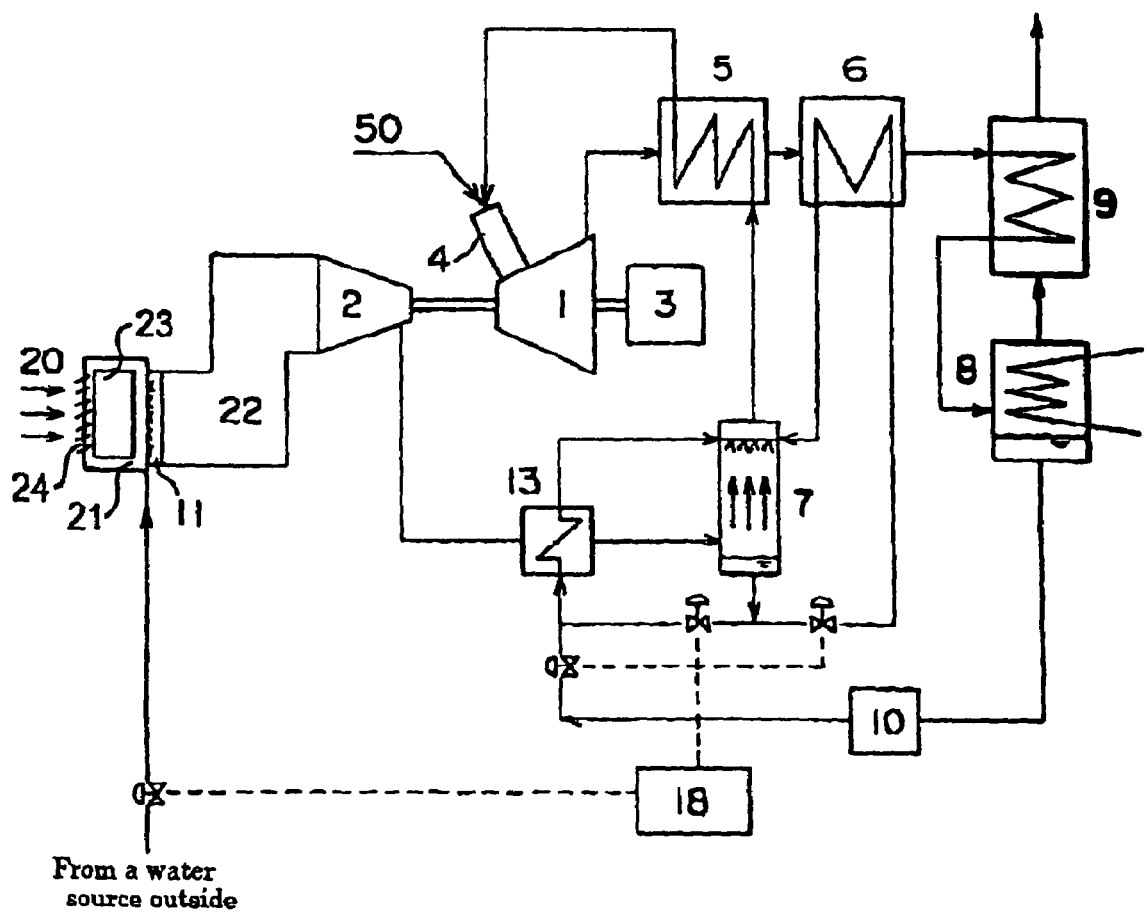
FIG. 3A is a schematic diagram showing a modification of the embodiment of FIG. 3.

FIG. 3 is a schematic diagram showing another embodiment of the present invention.

The embodiment shown in FIG. 3 is different from that shown in FIG. 1 in that the water supplying apparatus 15 is replaced with a water recovery apparatus 8 for recovering moisture contained in exhaust gas. To be more specific, in addition to the configuration shown in FIG. 1, the water recovery apparatus 8 is provided for receiving combustion exhaust gas having passed through the regenerator 5 (or combustion exhaust gas having passed through the supplied water heater 6 if the supplied water heater 6 is provided) and recovering moisture from the exhaust gas. A water processing apparatus 10 is also provided for purifying water recovered by the water recovery apparatus 8. The water purified by the water processing apparatus 10 is led to the spraying apparatus 11 or the humidifier 7.

Preferably, as shown in FIG. 3, in addition to the above configuration, an exhaust gas reheater 9 is provided for receiving exhaust gas having passed through the supplied water heater 6 and exhaust gas having passed through the water recovery apparatus 8 and performing heat exchange using the exhaust gases.

If the recovered water is insufficient, water to be supplied to the spraying apparatus 11 or the humidifier 7 is supplied from outside the system. Preferably, recovered water is preferentially supplied to the humidifier 7. To be more specific, the recovered water is led to the humidifier 7, and if the amount of the recovered water is more than the amount of water to be supplied to the humidifier 7, the excess amount of the recovered water is supplied to the spraying apparatus 11. To the spraying apparatus, water may be supplied from outside the system as needed.

In this embodiment, exhaust gas having passed through the regenerator 5 (or supplied water heater 6) is supplied to the exhaust gas reheater 9. At the reheater 9, the exhaust gas is subjected to heat exchange with low temperature exhaust gas whose moisture has been recovered by the water recovery apparatus 8, to be lowered in temperature, and is then supplied to the water recovery apparatus 8. At the water recovery apparatus 8, the moisture is recovered from the exhaust gas thus supplied thereto. One example of recovering moisture from exhaust gas is to cool the gas to a saturated temperature (dew-point) or less of water vapor contained in the gas. For example, the temperature of the exhaust gas may be lowered by cooling water supplied from outside the system. The exhaust gas emerged from the water recovery apparatus 8 is heated by the exhaust gas reheater 9, and is discharged from an exhaust tower (not shown) to atmospheric air.

It may be considered that carbon dioxide or impurities in the combustion exhaust gas be dissolved in the recovered water, and therefore, the recovered water is purified by the water processing apparatus 10. The recovered water thus purified is reused as water to be added to compressed air by the humidifier 7 or as water to be sprayed to air by the spraying apparatus 11. As water to be sprayed to air by the spraying apparatus 11, water supplied from the water supplying apparatus 15 (not shown) may be used in place of the recovered water.

This embodiment is characterized in that moisture recovered from exhaust gas is reused.

The ratio of the amount of the recovered water to the amount of moisture contained in exhaust gas is dependent on the degree of cooling the exhaust gas by the water recovery apparatus. If the exhaust gas is entirely cooled to about 38° C., it is possible to obtain recovered water to an extent equivalent to the amount of water to be supplied to air. In this case, it is possible to realize a system in which only the recovered water is reused and the necessity of newly supplying water is substantially eliminated. In general, industrial water having been subjected to water processing is used as water to be newly supplied to air. From the viewpoint of thermal energy, the temperature of industrial water is often equal to or somewhat lower than the temperature of atmospheric air. On the other hand, the temperature of water recovered from exhaust gas is in the order of about 38° C., which is higher than the temperature of atmospheric air. Further, recovered water whose temperature is in a higher range of about 60° C. can be obtained by optimizing the recovering manner. In this embodiment, the temperature of water to be supplied to the humidifier 7 is about 180° C., and such high temperature water is obtained by heat exchange using various heat exchangers. Accordingly, the temperature of water to be supplied to the humidifier is desirable to be as high as possible.

In this embodiment, since moisture recovered from exhaust gas is reused as water to be supplied, the temperature of the water to be supplied is higher than that of general industrial water. In other words, assuming that the calorie for obtaining high temperature water to be supplied to the humidifier is fixed, in the case of using the recovered water, the heat recovery amount by various heat exchangers can be made lower than that in the case of using industrial water. This is effective to miniaturize the heat exchanger or to reduce the flow rate of a circulated heat exchange medium. With this configuration, since the pressure loss of equipment connected to the gas turbine is reduced, it is possible to enhance the power generating efficiency. Further, in this embodiment, since the recovered water containing heat from the combustion exhaust gas can be used and the heat generated by the gas turbine can be returned to the upstream side of the combustor to be thus reused, the power generating efficiency of the gas turbine is made higher than that in the embodiment shown in FIG. 1. Further, the system in this embodiment can be operated at a high power generating efficiency even upon partial loading.

If evaporated liquid natural gas is used as fuel 50, a fuel heater for heat exchange of the fuel 50 with water flowing in a water supply path communicated to the spraying apparatus 11 can be provided in a fuel supply path. The fuel to be led to the combustor 4 is heated by water flowing to the spraying apparatus 11. The water whose temperature has been lowered by heat exchange at the fuel heater is supplied to the spraying apparatus 11.

A third embodiment will be described with reference to FIG. 4.

Figure 4:
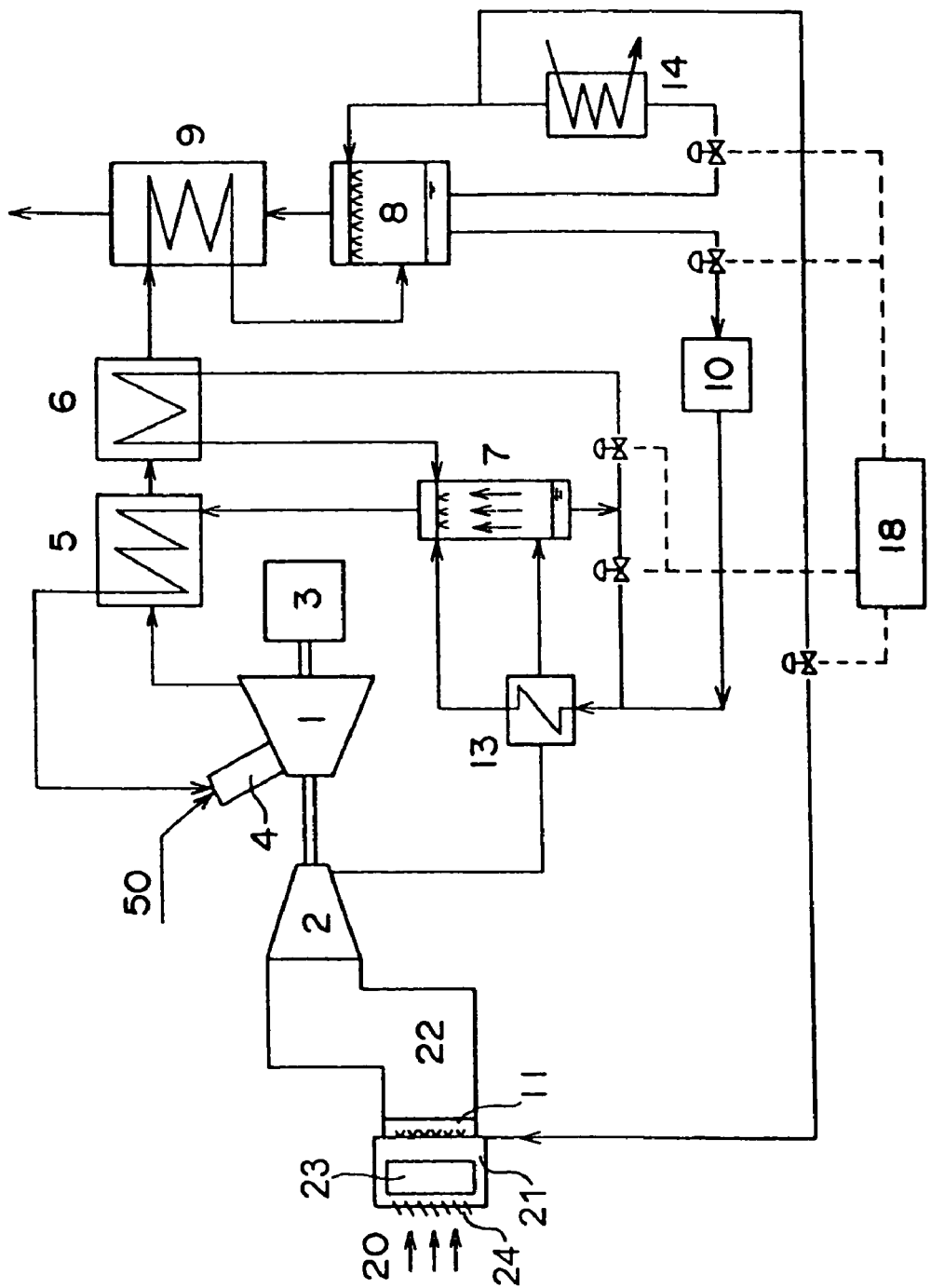
FIG. 4 is a schematic view showing one embodiment of the present invention.

FIG. 4 is a schematic view showing a further embodiment of the present invention.

The embodiment shown in FIG. 4 is different from the embodiment shown in FIG. 3 in that a direct contact type water recovery apparatus 8 for spraying cold water is provided and a water supply path through which water is supplied to the spraying apparatus 11 is different from a water supply path through which water is supplied to the humidifier 7.

To be more specific, in addition to the configuration shown in FIG. 1, the water recovery apparatus 8 is provided for receiving combustion exhaust gas having passed through the regenerator 5 (or combustion exhaust gas having passed through the supplied water heater 6 if the supplied water heater 6 is provided) and recovering moisture from the exhaust gas. A water processing apparatus 10 is provided for purifying water recovered by the water recovery apparatus 8. Further, a circulation water cooler 14 is provided for cooling the water-recovered by the water recovery apparatus 8. The water recovered by the water recovery apparatus 8 is supplied to the water supply path communicated to the humidifier 7, and the water recovered by the water recovery apparatus 8 and lowered in temperature is supplied to the water supply path communicated to the spraying apparatus 11.

Preferably, as shown in FIG. 4, in addition to the above configuration, an exhaust gas reheater 9 is provided for receiving exhaust gas having passed through the supplied water heater 6 and exhaust gas having passed through the water recovery apparatus 8 and performing heat exchange using the exhaust gases.

The exhaust gas having passed through the regenerator 5 (or supplied water heater 6) is supplied to the exhaust gas reheater 9, and is lowered in temperature by the exhaust gas having passed through the water recovery apparatus 8. The exhaust gas thus lowered in temperature is supplied to the water recovery apparatus 8. At the water recovery apparatus 8, moisture is recovered from the above exhaust gas. The exhaust gas emerged from the water recovery apparatus 8 passes through the exhaust gas reheater 9, being heated by the reheater 9, and is discharged from an exhaust tower (not shown) to atmospheric air.

One part of the water recovered by the water recovery apparatus 8 is led to the humidifier 7 via the water processing apparatus 10, and the other part is cooled by the circulation water cooler 14 and is led to the water recovery apparatus 8 again to be recovered. The water cooled by the circulation water cooler 14 is partially supplied to the spraying apparatus 11. Any water is purified before being supplied, as needed.

The spraying apparatus 11 is expected to cool suction air for the gas turbine, and to achieve such a purpose, the temperature of water to be supplied to the spraying apparatus 11 may be desirable to be low. On the other hand, since water to be supplied to the humidifier 7 is heated at a high temperature by thermal recovery before being supplied to the humidifier 7, the temperature of the water to be supplied to the humidifier 7 may be desirable to be high. For this reason, according to the system of the present invention, part of the water emerged from the circulation water cooler 14 is branched to the spraying apparatus 11, and the recovered water being highest in temperature in the water recovery loop is supplied to the humidifier 7. With this configuration, since the water recovery effect becomes high and also the suction air cooling effect becomes large, it is expected to increase the output power of the system. Also, it is possible to increase the amount of recovered water, and to decrease the amount of water to be supplied. Further, since the temperature of water to be supplied to the humidifier 7 becomes high, the humidifier and the heat exchanger for recovery of exhaust gas can be miniaturized, to reduce the pressure loss, thereby improving the power generating efficiency.

As a result, the system can be operated with a high power generating efficiency and a high output power under stable combustion. Further, it is possible to improve the power generating efficiency upon partial loading.

Figure 6:
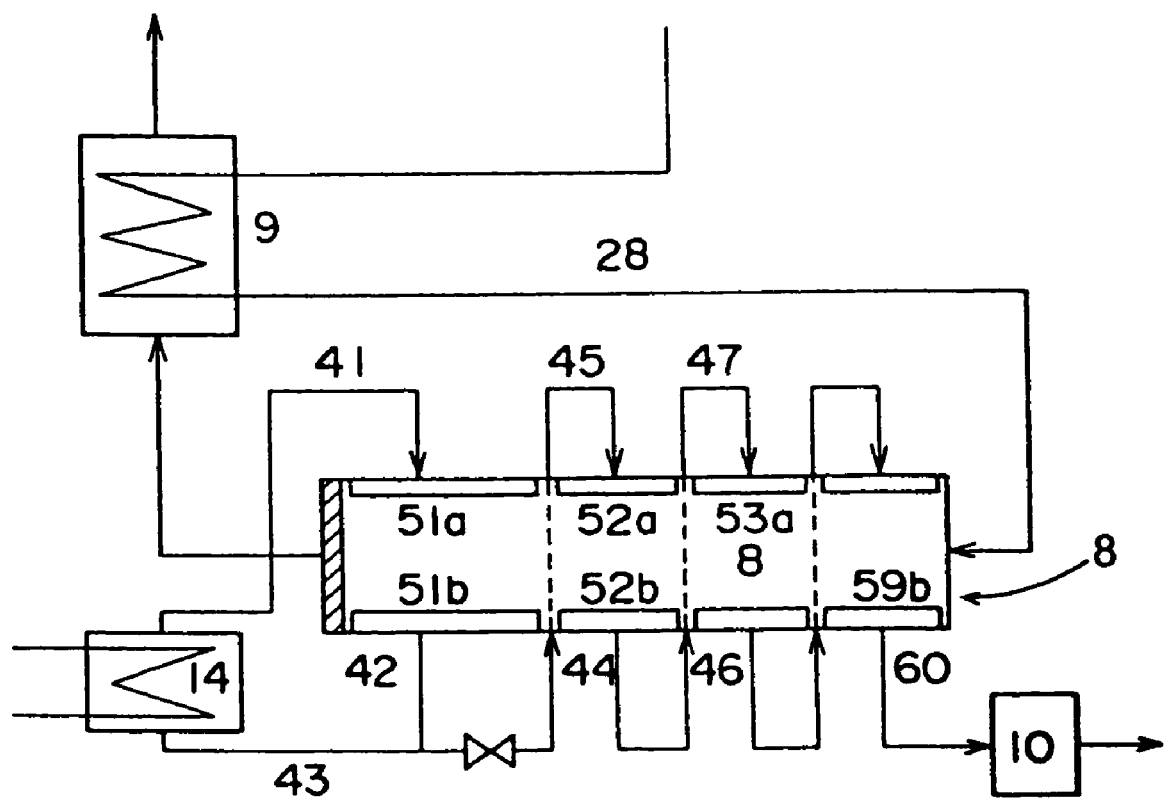
FIG. 6 is a schematic view showing one embodiment of a water recovery apparatus 8 portion.

The concrete example of the water recovery apparatus 8 will be described with reference to FIG. 6.

The condensation latent heat of water vapor under a condition of atmospheric pressure and 40° C. is about 570 kcal/kg. In the case of condensing 1 kg of the water vapor by spraying cold water (the temperature rise of the cold water is taken as 10° C.), since the specific heat of water is about 1 kcal/kgK, the necessary flow rate of the sprayed water becomes about 57 kg. The flow rate of sprayed water necessary for recovery of water from exhaust gas, that is, for condensation of water vapor is required to be several ten times the flow rate of the water vapor, although it is dependent on the design condition of the water recovery apparatus. By optimizing the water recovery manner, it is possible to separate high temperature recovered water from low temperature sprayed water. FIG. 6 shows a configuration for obtaining high temperature recovered water.

In this embodiment, two kinds of water, that is, high temperature water and low temperature water are recovered from the water recovery apparatus 8. The high temperature recovered water is supplied to the humidifier 7, and the lower temperature recovered water is supplied to the spraying apparatus 11.

Combustion exhaust gas containing a large amount of water vapor, which has passed through the supplied water heater 6, is cooled by a heat exchanger (for example, the exhaust gas reheater 9), and then it flows in the water recovery apparatus 8. At the water recovery apparatus 8, the combustion exhaust gas is brought into direct-contact with cooling water to be cooled into wet water vapor. Part of the water vapor is condensed to be recovered. The remaining exhaust gas is heated by the heat exchanger and is discharged to atmospheric air via a chimney. The water recovery apparatus 8 is composed of a plurality of water recover means which are arranged in series against the gas flow. Each water recovery means includes a cooling water scattering portion for scattering cooling water to the flowing exhaust gas, and a recovery portion for recovering scattered water and condensed water. The water recover means allows exhaust gas to flow between the cooling water scattering portion and the recovery portion. At least part of the recovered water is used as cooling water for the cooling water scattering portion of the water recovery means positioned on the upstream side of the gas flow. The details will be described below.

In the water recovery apparatus 8, cooling water passes through a pipe 41 and is scattered in exhaust gas at a cooling water scattering portion 51*a*, and scattered water and condensed water are recovered at a water recovery portion 51*b*. The recovered water passes through a pipe 43 and is cooled at the circulation water cooler 14, and further it passes through the pipe 41 to be thus circulated as cooling water. Part of the recovered water, which has been recovered at the water recovery portion 51*b*, is fed to a cooling water scattering portion 52*a* by way of pipes 44 and 45. Since the scattered water fed to the cooling water scattering portion 52*a* absorbs condensation latent heat, it is higher in temperature than the scattered water at the cooling water scattering portion 51*a*. The scattered water at the cooling water scattering portion 52*a* is recovered by a water recovery portion 52*b*, passing through pipes 46 and 47, and is then fed to a cooling water scattering portion 53*a*. By repeating such a process, it is possible to obtain the recovered water in a pipe 60 at the outlet of the water recovery apparatus, which is higher in temperature than the recovered water in a pipe 42. The recovered water in the pipe 60, discharged from the water recovery portion 59*b* of the water recovery means on the uppermost stream side is reused via the water processing apparatus 10.

The exhaust gas reheater 9 is used for heating exhaust gas after recovery of water. In the example shown in FIG. 6, the exhaust gas reheater 9 is configured as a gas-gas heat exchanger using exhaust gas before recovery of water as a heat source. If another heat source can be obtained, it can be used.

Accordingly, it is possible to obtain two kinds of recovered water different in temperature, and to easily obtain high temperature recovered water. This makes it possible to recover thermal energy possessed by exhaust gas in a high energy state.

With this configuration, upon cooling by direct contact type spraying, it is possible to obtain high temperature recovered water and low temperature spray circulation water.

In the high moisture gas turbine, moisture is contained in combustion gas in an amount of about 25% to 30% in volume, and the dew point of the combustion exhaust gas becomes about 70° C. By cooling exhaust gas to a temperature lower than the dew point, water can be recovered. And, since the direct contact type cooling by spraying cold water in this embodiment is configured as described above, it is possible to obtain recovered water having a high temperature of about 60° C. and a circulation water having a temperature of about 30° C. By making use of such high temperature water as water to be supplied to the humidifier, it is possible to obtain the same effect as that in the third embodiment shown in FIG. 4.

In this way, of recovered water obtained by the water recovered apparatus 8, a high temperature part of the recovered water is fed to the humidifier 7 by way of the water processing apparatus 10 and the supplied water heater 6. This makes it possible to further enhance the thermal efficiency of the plant. Meanwhile, of recovered water obtained by the water recovered apparatus 8, a lower temperature part of the recovered water is fed to the spraying apparatus 11 as water to be sprayed via the water processing apparatus 10. This is effective to further cool the temperature of suction air flowing in the suction air chamber 22.

A fourth embodiment will be described with reference to FIG. 5.

Figure 5:
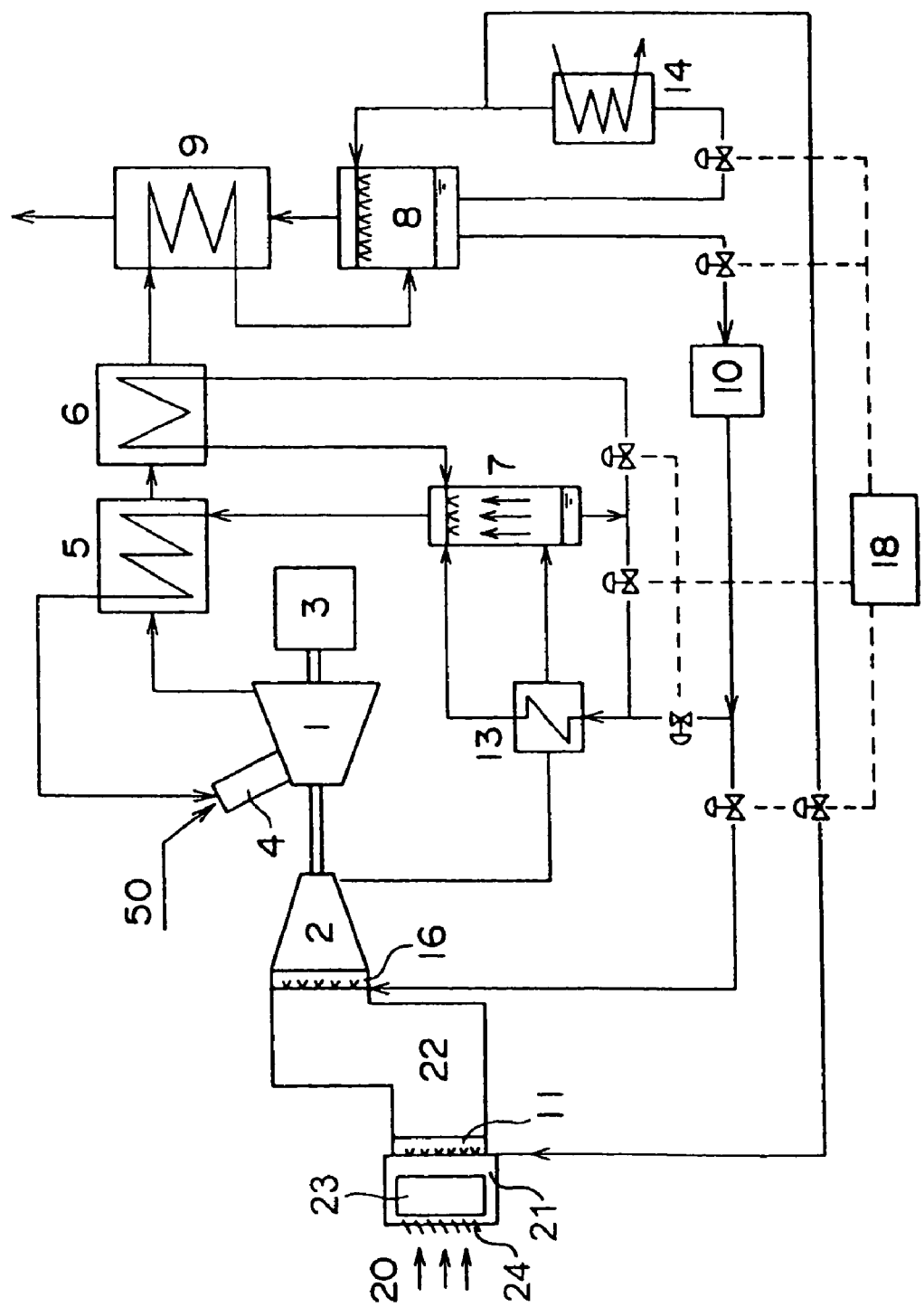
FIG. 5 is a schematic view showing one embodiment of the present invention.

FIG. 5 is a schematic diagram showing a further embodiment of the present invention.

The embodiment shown in FIG. 5 is different from the embodiment shown in FIG. 3 in that a direct-contact type water recovery apparatus for spraying cold water is used as the water recovery apparatus 8; a water supply path through which water is supplied to the spraying apparatus 11 is different from a water supply path through which water is supplied to the humidifier 7; and spraying apparatuses are arranged in a plurality of steps along the flow of air in the suction air chamber 22 in such a manner that the temperature of water sprayed from one of the spraying apparatuses positioned on the downstream side is higher than the temperature of water sprayed from one of the spraying apparatuses positioned on the upstream side.

To be more specific, in addition to the configuration shown in FIG. 1, the water recovery apparatus 8 is provided for receiving combustion exhaust gas having passed through the regenerator 5 (or combustion exhaust gas having passed through the supplied water heater 6 if the supplied water heater 6 is provided) and recovering moisture from the exhaust gas. A water processing apparatus 10 is provided for purifying water recovered by the water recovery apparatus 8. Further, a circulation water cooling apparatus 14 is provided for cooling water recovered by the water recovery portion 8. Water recovered by the water recovery apparatus 8 is supplied to the water supply path communicated to the humidifier 7. Part of the water recovered by the water recovery apparatus 8 is branched from a middle point of the water supply path communicated to the humidifier 7 and is then supplied, as water to be sprayed, to a spraying apparatus 16 which is disposed in such a manner as to be offset onto the inlet side of the compressor from the spraying apparatus 11 in the suction air chamber 22. Water recovered by the water recovery apparatus 8 and is lowered in temperature is supplied to the water supply path communicated to the spraying apparatus 11.

Preferably, as shown in FIG. 5, in addition to the above-described configuration, an exhaust gas reheater 9 for receiving exhaust gas having passed through the supplied water heater 6 and exhaust gas having passed through the water recovery apparatus 8 and performing heat exchange using the exhaust gases. The spraying apparatus 16 can be configured to exhibit the same effect as that obtained by the spraying apparatus 11.

Low temperature water is supplied to the spraying apparatus 11 like the embodiment shown in FIG. 4, and high temperature water having a temperature similar to that of water to be supplied to the humidifier 7 is supplied to the spraying apparatus 16.

With this configuration, water sprayed by the spraying apparatus 11 can exhibit a large suction air cooling effect equivalent to the output power increasing mechanism (1) described in the embodiment shown in FIG. 1, and water sprayed by the spraying apparatus 16, which are easy to be evaporated in the compressor, can exhibit large effects equivalent to the output power increasing mechanisms (2), (3) and (4) described in the embodiment in FIG. 1.

The reason why the water sprayed by the spraying apparatus 16 is easy to be evaporated in the compressor may be considered to be due to the fact that since the temperature of the water is high, thermal energy required for evaporation becomes small, and the fact that since the surface tension of water becomes small as the temperature of the water is increased, the sprayed water can be made fine and the surface area per unit weight of each fine water droplet becomes large, whereby evaporation of the sprayed water is promoted.

As a result, it may be considered that, of the total amount of the water droplets sprayed by the spraying apparatuses 11 and 16, the amount of water evaporated until the water droplets flow to the outlet of the compressor becomes larger than that described in the embodiment shown in FIG. 4. This makes it possible to further enhance the output power and the power generating efficiency of the system.

In this way, according to this embodiment, the spraying apparatuses are arranged in multiple steps along the flow of the air in the suction air chamber 22 in such a manner that the temperature of water sprayed by the spraying apparatus 16 positioned on the downstream side is higher than the temperature of water sprayed by the spraying apparatus 11 positioned on the upstream side. As a result, suction air is cooled by the front spraying apparatus 11 to thereby increase the flow rate in weight of air, and water being easy to be evaporated in the compressor 22 can be largely contained in air to be supplied to the compressor 22 by spraying high temperature water to the air by the rear spraying apparatus 16 disposed near the inlet of the compressor 22.

With this configuration, since the ratio of the amount of water supplied to suction air by the spraying apparatuses 11 and 16 to the amount of water supplied to compressed air by the humidifier becomes large, it is possible to attain stable combustion while further enhancing the output power and the power generating efficiency.

In addition, the spraying apparatus 11 is disposed near the suction air filtering chamber in the suction air chamber 22. For example, if a silencer is disposed in the suction air chamber 22, the spraying apparatus 11 is adjacently disposed directly after the silencer. The spraying apparatus 11 may be disposed directly after the filter in the suction air filtering chamber 21. The spraying apparatus 16 is preferably disposed near the inlet of the compressor in the suction air chamber 22, for example, near the boundary between the suction air chamber 22 and the inlet of the compressor 2 in the suction air chamber 22. With this arrangement, since a distance from a point at which water droplets are sprayed by the spraying apparatus 11 to a point at which they flow in the compressor becomes large, it is possible to increase the suction air cooling effect and hence to increase the output power of the system.

A sixth embodiment will be described with reference to FIGS. 1 and 3.

Each of the above-described embodiments can be regarded as an efficiency increasing apparatus which is provided in the existing gas turbine installation for improving the power generating efficiency. Even in this case, it is possible to enhance the output power and the power generating efficiency of the existing gas turbine installation while ensuring stability of a combustor by providing the efficiency increasing apparatus.

For example, the existing gas turbine power generating installation shown in FIG. 1 generally includes the suction air chamber 22 for sucking air 20, the compressor 2 for compressing the air supplied thereto and discharging the compressed air, the combustor 4 for burning fuel together with the air discharged from the compressor 2, the gas turbine 1 driven by combustion gas generated by the combustor 4, and the power generator 3 driven by the gas turbine.

An efficiency increasing apparatus including a spraying apparatus 11, a humidifier (moisture adding apparatus) 7, and a regenerator 5 is provided in the above existing gas turbine power generating installation. The spraying apparatus 11, provided in the air suction chamber 22 disposed on the upstream side of the compressor 2, is used for spraying water droplets to air to be supplied to the compressor 2, evaporating part of the sprayed water droplets until the water droplets are led in the compressor 2, and evaporating the non-evaporated water droplets led in the compressor 2 together with the air in a period in which the water droplets flow down in the compressor 2 together with the air. The humidifier 7 is used for adding water to the compressed air which contains moisture added in the form of water droplets by the spraying apparatus 11 and which is discharged from the compressor 2. The regenerator 5 is used for receiving the compressed air containing moisture added by the humidifier 7 and heating the compressed air by using a gas turbine exhaust gas as a heat source.

A water supply apparatus 15 is also provided for supplying water to the spraying apparatus 11 and the humidifier 7.

If necessary, an after-cooler 13 is provided for cooling the compressed air to be supplied to the humidifier 7 by using water to be supplied to the humidifier 7 as a cold heat source. Further, a supplied water heater 6 is provided for heating water to be supplied to the humidifier 7 by using exhaust gas having passed through the regenerator 5 as a heat source.

With this configuration, it is possible to realize a high moisture gas turbine installation capable of enhancing combustion stability while ensuring desired output power and power generating efficiency. Such a gas turbine installation exhibits the same effect as that obtained in the embodiment shown in FIG. 1.

A water supply path, through which water recovered from combustion exhaust gas having passed through the regenerator is supplied to at least the humidifier of the group of the spraying apparatus and the humidifier, may be provided together with or in place of the above water supplying apparatus 15.

With this configuration, it is possible to obtain the same effect as that obtained in the embodiment shown in FIG. 3.

What is claimed is:

1. A gas turbine installation including a compressor for compressing air, a combustor for burning fuel together with the air discharged from said compressor, and a turbine driven by combustion gas generated by said combustor, said gas turbine installation comprising:
   a spraying apparatus provided on an upstream side of said compressor for spraying water droplets to air to be supplied to said compressor;
   a water adding apparatus provided, in a path leading said compressed air discharged from said compressor to said combustor for adding water to said compressed air flowing in said path;
   a heat exchanger provided in said path on a downstream side of said water adding apparatus and an exhaust gas path leading exhaust gas discharged from said turbine to atmospheric air for heating the compressed air passed through said water adding apparatus, by said exhaust gas;
   a water recovery apparatus provided in said exhaust gas path on the downstream side of said heat exchanger for recovering moisture front said exhaust gas; and
   an exhaust gas reheater provided in said exhaust gas path on the downstream side of said heat exchanger for heating exhaust gas from which said moisture has been recovered at said water recovery apparatus by said exhaust gas passed through said heat exchanger.

2. A gas turbine installation including a compressor for compressing air, a combustor for burning fuel together with the air discharged from said compressor, and a turbine driven by combustion gas generated by said combustor, said gas turbine installation comprising:
   a spraying apparatus provided on an upstream side of said compressor for spraying water droplets to air to be supplied to said compressor;
   a water adding apparatus provided in a path leading said compressed air discharged from said compressor to said combustor for adding water to said compressed air flowing in said path;
   a regenerator provided in said path on a downstream side of said water adding apparatus and an exhaust gas path leading exhaust gas discharged from said turbine to atmospheric air for heat-exchanging between the compressed air passed through said water adding apparatus and said exhaust gas;
   a water recovery apparatus provided in said exhaust gas path on a downstream side of said regenerator for recovering moisture from said exhaust gas; and
   an exhaust gas reheater provided in said exhaust gas path on the downstream side of said regenerator for heating exhaust gas from which said moisture has been recovered at said water recovery apparatus by said exhaust gas passed through said regenerator.

3. A gas turbine installation including a compressor for compressing air, a combustor for burning fuel together with the air discharged from said compressor, and a turbine driven by combustion gas generated by said combustor, said gas turbine installation comprising:
   a spraying apparatus provided on an upstream side of said compressor for spraying water droplets to air to be supplied to said compressor;
   a water adding apparatus provided in a path leading said compressed air discharged from said compressor to said combustor for adding water to said compressed air flowing in said path;
   a heat exchanger provided in said path on a downstream side of said water adding apparatus and an exhaust gas path leading exhaust gas discharged from said turbine to atmospheric air for heating the compressed air passed through said water adding apparatus, by said exhaust gas;
   a water heater provided in said exhaust gas path on a downstream side of said heat exchanger for heating water to be supplied to said water adding apparatus by using exhaust gas having passed through said heat exchanger, as a heat source;
   a water recovery apparatus provided in said exhaust gas path on a downstream side of said water heater for recovering moisture from said exhaust gas; and
   an exhaust gas reheater provided in said exhaust gas path on the downstream side of said water heater for heating exhaust gas from which said moisture has been recovered at said water recovery apparatus by said exhaust gas passed through said water heater.

4. A gas turbine installation including a compressor for compressing air, a combustor for burning fuel together with the air discharged from said compressor, and a turbine driven by combustion gas generated by said combustor, said gas turbine installation comprising:
   a spraying apparatus provided on an upstream side of said compressor for spraying water droplets to air to be supplied to said compressor;

a water adding apparatus provided in a path leading said compressed air discharged from said compressor to said combustor for adding water to said compressed air flowing in said path;

a regenerator provided in said path on a downstream side of said water adding apparatus and an exhaust gas path leading exhaust gas discharged from said turbine to atmospheric air for heat exchanging between the compressed air passed through said water adding apparatus, and said exhaust gas;

a water heater provided in said exhaust gas path on a downstream side of said regenerator for heating water to be supplied to said water adding apparatus by using exhaust gas having passed through said regenerator as a heat source;

a water recovery apparatus provided in said exhaust gas path on a downstream side of said water heater for recovering moisture from said exhaust gas; and an exhaust gas reheater provided in said exhaust gas path on the downstream side of said water heater for heating exhaust gas from which said moisture has been recovered at said water recovery apparatus by said exhaust gas passed through said water heater.

5. A gas turbine installation including a compressor for compressing air, a combustor for burning fuel together with the air discharged from said compressor, and a turbine driven by combustion gas generated by said combustor, said gas turbine installation comprising:

a spraying apparatus provided on an upstream side of said compressor for spraying water droplets to air to be supplied to said compressor;

a water adding apparatus provided in a path leading said compressed air discharged from said compressor to said combustor for adding water to said compressed air flowing in said path;

a heat exchanger provided in said path on a downstream side of said water adding apparatus for heating the compressed air passed through said water adding apparatus by exhaust gas discharged from the turbine;

an exhaust gas reheater for heating exhaust gas to he discharged to atmospheric air by exhaust gas passed through said heat exchanger; and a water recovery apparatus for recovering moisture from exhaust gas which is supplied via said exhaust gas reheater from said heat exchanger;

wherein said exhaust gas reheater exchanges heat between exhaust gas having passed through said heat exchanger and exhaust gas from which said moisture is recovered by said water recovery apparatus.

6. A gas turbine installation including a compressor for compressing air, a combustor for burning fuel together with the air discharged from said compressor, and a turbine driven by combustion gas generated by said combustor, said gas turbine installation comprising:

a spraying apparatus provided on an upstream side of said compressor for spraying water droplets to air to be supplied to said compressor;

a water adding apparatus provided in a path leading said compressed air discharged from said compressor to said combustor for adding water to said compressed air flowing in said path;

a regenerator for heat-exchanging between the compressed air passed through said water adding apparatus and exhaust gas discharged from said turbine;

an exhaust gas reheater for heating exhaust gas to be discharged to atmospheric air by exhaust gas passed through said regenerator; and a water recovery apparatus for recovering moisture from exhaust gas which is supplied via said exhaust gas reheater from said regenerator;

wherein said exhaust gas reheater exchanges heat between exhaust gas having passed through said regenerator and exhaust gas from which said moisture is recovered by said water recovery apparatus.

* * * * *